US010435328B2

(12) United States Patent
Weinberger

(10) Patent No.: US 10,435,328 B2
(45) Date of Patent: Oct. 8, 2019

(54) EXPANDED-GLASS GRANULAR MATERIAL AND METHOD FOR PRODUCING SAME

(71) Applicant: DENNERT PORAVER GMBH, Postbauer-Heng (DE)

(72) Inventor: Karl Weinberger, Bischofsmais (DE)

(73) Assignee: Dennert Poraver GmbH, Postbauer-Heng (DE)

( * ) Notice: Subject to any disclaimer, the term of this patent is extended or adjusted under 35 U.S.C. 154(b) by 0 days.

(21) Appl. No.: 15/667,782

(22) Filed: Aug. 3, 2017

(65) Prior Publication Data

US 2017/0327412 A1    Nov. 16, 2017

Related U.S. Application Data

(63) Continuation of application No. PCT/EP2016/051381, filed on Jan. 22, 2016.

(30) Foreign Application Priority Data

Feb. 3, 2015   (DE) ........................ 10 2015 201 842

(51) Int. Cl.
| | | |
|---|---|---|
| *C03B 19/08* | (2006.01) | |
| *C03C 11/00* | (2006.01) | |
| *C03C 1/02* | (2006.01) | |
| *C03C 3/087* | (2006.01) | |

(52) U.S. Cl.
CPC ............ *C03C 11/007* (2013.01); *C03B 19/08* (2013.01); *C03C 1/026* (2013.01); *C03C 3/087* (2013.01)

(58) Field of Classification Search
CPC ....... C03C 11/007; C03C 1/026; C03C 3/087; C03B 19/08
USPC .......................................................... 428/406
See application file for complete search history.

(56) References Cited

U.S. PATENT DOCUMENTS

| | | | |
|---|---|---|---|
| 3,744,984 A | * | 7/1973 | Sato ........................ C03B 19/08 65/22 |
| 3,870,496 A | | 3/1975 | Cutler |
| 4,086,098 A | | 4/1978 | Le Ruyet et al. |
| 4,332,907 A | | 6/1982 | Vieli |
| 9,018,139 B2 | | 4/2015 | Tschiersch et al. |
| 2007/0186587 A1 | | 8/2007 | Dennert |
| 2008/0011199 A1 | | 1/2008 | Dennert |
| 2013/0029885 A1 | * | 1/2013 | Tschiersch ............ C03B 19/108 507/269 |

FOREIGN PATENT DOCUMENTS

| | | | |
|---|---|---|---|
| DE | 4344994 A1 | | 7/1995 |
| DE | 19734791 A1 | | 2/1999 |
| DE | 19837327 A1 | | 2/2000 |
| DE | 20022776 | * | 3/2002 |
| DE | 20022776 U1 | | 5/2002 |
| DE | 10033999 A1 | | 6/2002 |
| DE | 10146806 A1 | | 10/2002 |
| DE | 10334997 A1 | | 2/2005 |
| DE | 102004056781 A1 | | 6/2006 |
| DE | 102010000049 A1 | | 7/2011 |
| DE | 102010039232 | * | 2/2012 |
| DE | 102010039232 A1 | | 2/2012 |
| EP | 0010069 A1 | | 4/1980 |
| EP | 0661240 A2 | | 7/1995 |
| EP | 1183215 A1 | | 3/2002 |
| EP | 1183215 | * | 11/2003 |
| EP | 2647605 | * | 10/2013 |
| EP | 2647605 A1 | | 10/2013 |
| EP | 2708517 | * | 3/2014 |
| EP | 2708517 A1 | | 3/2014 |
| GB | 1002786 A | | 8/1965 |
| WO | 9819976 A1 | | 5/1998 |
| WO | 0061512 A1 | | 10/2000 |
| WO | 2005087676 A1 | | 9/2005 |

* cited by examiner

*Primary Examiner* — Leszek B Kiliman
(74) *Attorney, Agent, or Firm* — Laurence A. Greenberg; Werner H. Stemer; Ralph E. Locher

(57) ABSTRACT

In a method for producing an expanded-glass granular material, starting materials containing glass powder, water glass, at least one blowing agent, and metakaolin, are mixed in order to form a homogeneous slurry. The slurry is granulated to form raw granular-material particles, which are foamed at a baking temperature between 780° C. and 950° C. in order to form expanded-glass granular-material particles. The expanded-glass granular material has a long-term water absorption of less than 25 volume percent when the expanded-glass granular material is exposed to water for a time period of 21 days.

15 Claims, No Drawings

EXPANDED-GLASS GRANULAR MATERIAL AND METHOD FOR PRODUCING SAME

CROSS-REFERENCE TO RELATED APPLICATION

This is a continuation application, under 35 U.S.C. § 120, of copending international application No. PCT/EP2016/051381, filed Jan. 22, 2016, which designated the United States; this application also claims the priority, under 35 U.S.C. § 119, of German patent application No. DE 10 2015 201 842.3, filed Feb. 3, 2015; the prior applications are herewith incorporated by reference in their entirety.

BACKGROUND OF THE INVENTION

Field of the Invention

The invention relates to expanded glass granules. The invention further relates to a method for producing expanded glass granules.

The uses of expanded glass granules include insulants, lightweight aggregates in construction materials such as concrete, for example, or fillers in liquid or pastelike systems.

Expanded glass granules and methods for producing them are known from, for example, U.S. Pat. No. 3,870,496, WO 2005/087676 A1 (corresponding to U.S. patent publication No. 20070186587), DE 43 44 994 A1, U.S. Pat. No. 4,086,098 A, EP 0 661 240 B1, DE 100 33 999 A1, DE 197 34 791 B4, DE 103 34 997 A1, EP 0 010 069 B2 (corresponding to U.S. Pat. No. 4,332,907), DE 198 37 327 A1, WO 98/19976 A1, DE 101 46 806 B4, and DE 10 2010 000 049 B4 (corresponding to U.S. Pat. No. 9,018,139).

SUMMARY OF THE INVENTION

It is an object of the invention, then, to provide expanded glass granules having particularly low water absorption. The intention here is to achieve improvement in particular in the long-term water absorption of the expanded glass granules over a period of several days or weeks.

In the course of the method of the invention for producing expanded glass granules, specified starting materials are mixed to form a homogeneous slip (also referred to as the "batch"). The starting materials here contain finely ground glass, waterglass, and at least one expandant. The waterglass is introduced preferably in aqueous solution. To attain target moisture content desirable for the further processing of the slip, water additionally is added as required to the starting materials identified above.

The slip produced from the starting materials is granulated to form crude granular particles (green particles). The granulating operation here is performed preferably by use of a granulating plate or a spraying tower, depending on the particle size desired for the green particles. The green bodies may alternatively also be granulated within the invention using a continuous granulating mixer, a ploughshare mixer, a fluidized bed granulating device or a compactor.

Optionally after drying and/or sieving, the green particles produced accordingly are foamed at a firing temperature of between 780° C. and 950° C. to form expanded glass granular particles. This foaming operation is driven here by formation of gas, which is caused by evaporation or chemical reaction of the expandant. The firing oven used to heat the green particles to the firing temperature is preferably a rotary tube furnace. The resultant expanded glass particles have a multicellular, at least largely closed-pore structure, and a smooth, closed surface.

To prevent the green particles, and the expanded glass granular particles which develop from them, from sticking both to one another and to the oven wall, the granular green particles are mixed with a separating agent. Adding the separating agent to the granular green particles is preferably done only when the granular green particles are being fed into the firing oven.

The separating agent used is, conventionally, (virgin) kaolin. As already described in published, non-prosecuted German patent application DE 10 2004 056 781 A1, the kaolinite ($Al_4[(OH)_8Si_4O_{10}]$), which is the primary constituent of kaolin, is calcined by the action of heat in the firing oven at temperatures of around 700° C., in accordance with the formula

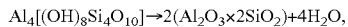
$$Al_4[(OH)_8Si_4O_{10}] \rightarrow 2(Al_2O_3 \times 2SiO_2) + 4H_2O,$$

to form metakaolin ($Al_2O_3 \times 2SiO_2$), with the liberated water being evaporated.

In accordance with DE 10 2004 056 781 A1, the metakaolin obtained as a byproduct of the production of expanded glass is separated from the expanded glass granules after the firing operation and is returned to the firing operation as a separating agent, or is supplied as an independent product to some other use, as an ingredient in a flow adhesive mixture, for example.

In contradistinction to this, in accordance with the invention, metakaolin is actually used as an additional starting material for production of the slip. In a preferred development of the method, metakaolin is admixed to the starting materials which have been mixed to form the slip, with a metakaolin solids fraction of between 0.5 mass % and 7 mass %, preferably between 1.0 mass % and 5 mass %.

The solids fraction of a defined starting material (in the present instance, metakaolin) is always given, here and below, by the mass of this starting material employed in producing the slip, relative to the total mass of the solids containing in the starting materials. The total mass of the solids containing in the starting materials is given in turn by the total mass of the slip minus the total mass of the water present in the slip in liquid form.

Surprisingly it has emerged that the admixing of metakaolin to the batch produces a substantial improvement in the chemical stability, and hence a considerable reduction in the absorption of water by the expanded glass granules over the medium and long terms. This effect is based, as has been recognized, in particular on the partial dissolution of metakaolin even while the slip is being produced, in other words in the aqueous batch of the starting materials. In the course of this partial dissolution, aluminum is leached out, diffuses into the waterglass matrix during the subsequent foaming operation, and is incorporated there to form stable aluminosilicates.

The solids fractions of the starting materials—finely ground glass, waterglass, and expandant—are selected preferably as follows:

finely ground glass: 83 mass % to 90 mass %, preferably 85.3 mass % to 88.9 mass %;

waterglass: 7.5 mass % to 11 mass %, preferably 8.1 mass % to 10.5 mass %; and expandant: 0.8 mass % to 2.5 mass %, preferably 1.0 mass % to 2.3 mass %.

It has emerged that a further improvement in the chemical stability and, correspondingly, a further reduction in the absorption of water by the expanded glass granules can be achieved if the waterglass used for producing the slip, rather than the sodium waterglass customarily used, is potassium waterglass. The waterglass fraction of the starting materials here, for the purposes of the invention, can be added exclusively in the form of potassium waterglass—in that case, then, no sodium waterglass is added to the starting materials. In order to minimize the increase in firing temperature that is associated with the use of potassium waterglass, however, a preferred option is to use potassium waterglass and sodium waterglass in combination. Accordingly, in a preferred embodiment of the invention, the starting materials that are mixed to form the slip comprise not only a—preferably predominant—fraction of potassium waterglass but also sodium waterglass, more particularly with the following solids fractions:

potassium waterglass: 6.5 mass % to 9 mass %, preferably 6.8 mass % to 8.4 mass %; and sodium waterglass: 1 mass % to 2.5 mass %, preferably 1.3 mass % to 2.1 mass %.

In a useful embodiment of the invention, the expandant used contains exclusively sodium nitrate (sodium saltpeter, $NaNO_3$). As an alternative to this, expandants included in the starting materials that are mixed to form the slip are sodium nitrate and glucose (dextrose, $C_6H_{12}O_6$) in combination, preferably in the following solids fractions:

sodium nitrate: 0.75 mass % to 2.5 mass %, preferably 1.0 mass % to 2.2 mass %, and glucose: 0.05 mass % to 0.5 mass %, preferably 0.06 mass % to 0.16 mass %.

Aluminum hydroxide $(Al(OH)_3)$ is optionally admixed additionally to the starting materials that are mixed to form the slip, preferably with a solids fraction of between 0.25 mass % and 3 mass %.

In the context of the invention, the starting materials may be alternatively dry-dispersed or wet-dispersed. In one advantageous version of the method, the starting materials are first mixed to form a crude batch, which is wet-ground to form the slip over several hours, after addition or with addition of water.

The expanded glass granules of the invention are distinguished by particularly low long-term water absorption of less than 25 volume %, preferably even less than 15 volume %, when the expanded glass granules are exposed to water for a period of 21 days. The water absorption here is measured in particular in accordance with DIN EN 1097-6. The expanded glass granules of the invention here are produced more particularly by the method of the invention as described above.

Particularly for grains (particle diameters of the expanded glass granules in millimeters) of 0.25-0.5 and 0.5-1.0, long-term water absorption values that are substantially lower still are obtained when employing the method of the invention, these values being situated more particularly in the order of magnitude of 7 volume % to 10 volume % (after 21 days' water exposure).

The expanded glass granules of the invention here preferably have an apparent particle density of less than 900 $kg/m^3$ (apparent density as per DIN EN 1097-6, DIN EN 1097-7).

DETAILED DESCRIPTION OF THE INVENTION

Described below are four working examples of the expanded glass granules of the invention and also of the respectively associated production method, these examples being identified below as B1 to B4.

For the individual examples B1 to B4, starting materials with the following composition were first provided:

TABLE 1

Solids fractions of the starting materials for examples B1 to B4

|    | GM    | AHO  | NS   | GL   | KWG  | NWG  | MK   |
|----|-------|------|------|------|------|------|------|
| B1 | 88.03 | —    | 2.05 | 0.16 | 6.21 | 2.02 | 1.54 |
| B2 | 88.93 | —    | 1.34 | 0.06 | 6.27 | 1.83 | 1.57 |
| B3 | 83.75 | 1.92 | 1.68 | 0.10 | 6.98 | 0.48 | 5.10 |
| B4 | 85.32 | —    | 2.00 | 0.06 | 8.18 | —    | 4.44 |

The abbreviations in Table 1 have the following meanings:

a)—GM finely ground glass,
b)—AHO aluminum hydroxide $(Al(OH)_3)$,
c)—NS sodium nitrate,
d)—GL glucose,
e)—KWG potassium waterglass
f)—NWG sodium waterglass, and
g)—MK metakaolin.

The values contained in Table 1 relate in each case to the solids fraction of the respective starting material, reported in mass %, relative to the total solids mass of the starting materials, calculated with subtraction of the water fraction.

The finely ground glass was produced in each case in a step preceding the method, from recycled glass (specifically, a mixture of container glass and flat glass), by grinding in a ball mill to a particle size of $d_{97}<40$ μm.

The starting materials listed in Table 1 were stirred in each case in a mixer for 30 minutes to form a homogeneous slip. The (potassium and/or sodium) waterglass here was added in aqueous solution in each case. Water was added to set target moisture content for the slip that is listed in Table 2.

The resulting slip was subsequently granulated on a granulating plate. The resultant green particle granules were each dried at a drying temperature of 200° C. for 10 minutes and sieved as and when required. The dried green particle granules were introduced into a rotary tube furnace, with addition of kaolin as separating agent. In the rotary tube furnace, the green particle granules were foamed in each case for around 5 to 10 minutes at a firing temperature which can be seen from Table 2.

TABLE 2

Target moisture content of slip, grade of expanded glass granules, and firing temperature for examples B1 to B4.

|    | Target moisture content | Grade    | Firing temperature |
|----|-------------------------|----------|--------------------|
| B1 | 17.3                    | 0.5-1.0  | 825                |
| B2 | 16.85                   | 0.5-1.0  | 810                |
| B3 | 15.89                   | 0.5-1.0  | 818                |
| B4 | 40                      | 0.25-0.5 | 910                |

Table 2 contains the target moisture content, in this case in mass % of the water present in liquid form in the slip, based on the total mass of the slip. The grade reported in Table 2 indicates the particle diameter in millimeters of the expanded glass granules (obtained after the foaming operation). The firing temperature is reported in ° C.

The expanded glass granules resulting from the foaming operation were subsequently cooled and then sieved, to give expanded glass granules having a grade as reported in Table 2.

The sieved, expanded glass granules were analyzed for strength, bulk density, apparent particle density, water absorption, and chemical composition. The properties resulting from this analysis for examples B1 to B4 are apparent from Tables 3 to 5:

TABLE 3

Strength, bulk density, and apparent particle density of the expanded glass granules for examples B1 to B4

|    | Strength | Bulk density | Apparent particle density |
|----|----------|--------------|---------------------------|
| B1 | 1.76     | 311.2        | 592                       |
| B2 | 3.42     | 322.2        | 604                       |
| B3 | 2.50     | 377          | 686                       |
| B4 | 3.43     | 450          | 816                       |

Table 3 reports
the strength according to DIN EN 130055-1 (mean particle strength) in $N/mm^2$,
the bulk density in $kg/m^3$, and
the apparent particle density in accordance with DIN EN 1097-6, DIN EN 1097-7 (apparent density) in $kg/m^3$.

The bulk density reported in Table 3 is determined by filling a 1000 ml measuring cylinder—in full-to-the-brim form—with the sample under analysis in one operation, using a powder hopper, thus forming a cone of bulk material above the end of the measuring cylinder. The cone of bulk material is smoothed off using a ruler guided over the opening of the measuring cylinder. The weight of the filled measuring cylinder minus its empty weight gives the bulk density of the sample under analysis.

TABLE 4

Long-term water absorption of the expanded glass granules for examples B1 to B4

|    | Long-term water absorption | | |
|----|----------------------------|---|---|
|    | after 7 days | after 14 days | after 21 days |
| B1 | 3.1 | 5.2 | 7.0 |
| B2 | 4.5 | 7.1 | 10.0 |
| B3 | 5.2 | 8.0 | 10.1 |
| B4 | 5.3 | 6.7 | 7.8 |

TABLE 5

Chemical composition of the expanded glass granules for examples B1 to B4

|    | $SiO_2$ | $Al_2O_3$ | $Na_2O$ | $K_2O$ | MgO | CaO | $Fe_2O_3$ | Balance |
|----|---------|-----------|---------|--------|-----|-----|-----------|---------|
| B1 | 69.7 | 2.1 | 12.7 | 2.5 | 1.8 | 9.0 | 0.2 | 2.0 |
| B2 | 70.6 | 2.4 | 12.0 | 2.4 | 1.8 | 9.1 | 0.4 | 1.3 |
| B3 | 68.9 | 3.4 | 12.2 | 2.2 | 3.4 | 7.5 | 0.2 | 2.1 |
| B4 | 69.6 | 2.8 | 11.9 | 3.0 | 2.4 | 8.3 | 0.2 | 1.8 |

In Table 5,
$SiO_2$ stands for silicon dioxide,
$Al_2O_3$ stands for aluminum oxide,
$Na_2O$ stands for sodium oxide,
$K_2O$ stands for potassium oxide,
MgO stands for magnesium oxide (magnesia),
CaO stands for calcium oxide,
$Fe_2O_3$ stands for iron(III) oxide, and
Balance stands for fractions of other oxides.

The numerical figures in Table 5 report the mass fractions of the respective compound or group of compounds in mass %, based on the total (dry) mass of the expanded glass granules.

The invention is particularly clear from the working examples described above, but is nevertheless not confined to these examples. Instead, numerous further embodiments of the invention can be derived from the claims and from the foregoing description.

The invention claimed is:

1. A method for producing expanded glass granules, which comprises the following steps of:
   mixing a homogeneous slip from starting materials containing finely ground glass, potassium waterglass, metakaolin, and at least one expandant, the starting materials being mixed for forming the homogeneous slip, based on a total mass of solids contained in the starting materials, containing a metakaolin solids fraction of between 0.5 mass % and 7 mass %;
   granulating the homogeneous slip to form crude granular particles; and
   foaming the crude granular particles to form expanded glass granular particles at a firing temperature of between 780° C. and 950° C.

2. The method according to claim 1, wherein the starting materials mixed to form the homogeneous slip, based on a total mass of solids contained in the starting materials, contain:
   finely ground glass solids fractions of between 83 mass % and 90 mass %;
   waterglass solids fractions of between 7.5 mass % and 11 mass %; and
   expandant solids fractions of between 0.8 mass % and 2.5 mass %.

3. The method according to claim 1, wherein the starting materials mixed to form the homogeneous slip contain the potassium waterglass and sodium waterglass.

4. The method according to claim 3, wherein the starting materials mixed to form the homogeneous slip, based on a total mass of a solids contained in the starting materials, contain:
   potassium waterglass solids fractions of between 7 mass % and 9 mass %; and
   sodium waterglass solids fractions of between 1 mass % and 2.5 mass %.

5. The method according to claim 1, wherein the starting materials mixed to form the homogeneous slip contain sodium nitrate as an expandant.

6. The method according to claim 5, wherein the starting materials mixed to form the homogeneous slip contains sodium nitrate and glucose as expandants.

7. The method according to claim 6, wherein the starting materials mixed to form the homogeneous slip, based on a total mass of solids contained in the starting materials, contains:
   sodium nitrate solids fractions of between 0.75 mass % and 2.5 mass %; and
   glucose solids fractions of between 0.05 mass % and 0.5 mass %.

8. The method according to claim 1, wherein the starting materials mixed to form the homogeneous slip contain aluminum hydroxide.

9. The method according to claim 8, wherein the starting materials mixed to form the homogeneous slip, based on the total mass of the solids contained in the starting materials, contain an aluminum hydroxide solids fraction of between 0.25 mass % and 3 mass %.

10. The method according to claim 1, wherein the starting materials mixed to form the homogeneous slip, based on a total mass of solids contained in the starting materials, contain a metakaolin solids fraction of between 1.0 mass % and 5 mass %.

11. The method according to claim 1, wherein the starting materials mixed to form the homogeneous slip, based on a total mass of solids contained in the starting materials, contain:
- finely ground glass solids fractions of between 85.3 mass % and 88.9 mass %;
- waterglass solids fractions of between 8.1 mass % and 10.5 mass %; and
- expandant solids fractions of between 1.0 mass % and 2.3 mass %.

12. The method according to claim 3, wherein the starting materials mixed to form the homogeneous slip, based on a total mass of a solids contained in the starting materials, contain:
- potassium waterglass solids fractions of between 6.8 mass % and 8.4 mass %; and
- sodium waterglass solids fractions of between 1.3 mass % and 2.1 mass %.

13. The method according to claim 6, wherein the starting materials mixed to form the homogeneous slip, based on a total mass of solids contained in the starting materials, contains:
- sodium nitrate solids fractions of between 1.0 mass % and 2.2 mass %; and
- glucose solids fractions of between 0.06 mass % and 0.16 mass %.

14. Expanded glass granules, comprising:

a homogeneous slip containing starting materials including finely ground glass, potassium waterglass, metakaolin, and at least one expandant, said starting materials mixed for forming said homogeneous slip, based on a total mass of solids contained in said starting materials, containing a metakaolin solids fraction of between 0.5 mass % and 7 mass %;

the homogeneous slip being granulated to form crude granular particles, the crude granular particles being foamed to form expanded glass granular particles at a firing temperature of between 780° C. and 950° C.; and the expanded glass granules having a long-term water absorption of less than 15 volume percent when exposed to water for a period of 21 days.

15. The expanded glass granules according to claim 14, wherein the expanded glass granules have an apparent particle density of less than 900 kg/m$^3$.

* * * * *